United States Patent
Lee et al.

[11] Patent Number: 6,146,487
[45] Date of Patent: Nov. 14, 2000

[54] RAPID PROTOTYPING METHOD FOR MINIMIZING POST PROCESSING

[75] Inventors: Kun Woo Lee; In Haeng Cho, both of Seoul, Rep. of Korea

[73] Assignee: Republic of Korea, Seoul, Rep. of Korea

[21] Appl. No.: 09/179,144

[22] Filed: Oct. 26, 1998

[30] Foreign Application Priority Data

Jul. 10, 1998 [KR] Rep. of Korea ............ 98-27775

[51] Int. Cl.[7] .................. B32B 31/00; B44C 3/02
[52] U.S. Cl. .............. 156/268; 156/248; 156/263; 156/267
[58] Field of Search .................. 156/264, 344, 156/248, 517, 267, 268, 263

[56] References Cited

U.S. PATENT DOCUMENTS

| | | | |
|---|---|---|---|
| 5,015,312 | 5/1991 | Kinzie | 156/63 |
| 5,071,503 | 12/1991 | Berman | 156/250 |
| 5,183,598 | 2/1993 | Hellé et al. | 264/22 |
| 5,514,232 | 5/1996 | Burns | 156/64 |
| 5,578,155 | 11/1996 | Kawaguchi | 156/267 |
| 5,730,817 | 3/1998 | Feygin et al. | 156/64 |
| 5,997,681 | 12/1999 | Kinzie | 156/263 |

FOREIGN PATENT DOCUMENTS

| | | |
|---|---|---|
| 0 846 549 | 6/1998 | European Pat. Off. . |
| 7-195533 | 8/1995 | Japan . |
| 8-318575 | 12/1996 | Japan . |
| 91/12957 | 9/1991 | WIPO . |

*Primary Examiner*—Linda L. Gray
*Attorney, Agent, or Firm*—Perman & Green, LLP

[57] ABSTRACT

A method for rapid prototyping including generating cutting data including generating a support structure, deriving a silhouette curve, slicing three dimensional data into two dimensional sectional data, generating bridges for every island in the two dimensional sectional data, and generating cutting data and grouping the cutting data into first and second cutting data groups. The method also includes building a part in which an adhesive sheet is used as bond layers which includes cutting the adhesive sheet according to the first cutting data in which a perimeter of excess adhesive sheet region is cut to provide excess adhesive sheet material, peeling of backing paper of the adhesive sheet in which the excess adhesive sheet material is removed with the peeled backing paper, providing and lifting a platform in which the cut adhesive sheet is fed to a previously-built part, bonding in which the fed sheet is bonded to the previously-built part, cutting the bonded adhesive sheet according to the second cutting data in which remaining adhesive sheet edges are cut, lowering the platform, and post processing where the support structure and ridges are removed to form the built part.

4 Claims, 11 Drawing Sheets

PRIOR ART

Figure 1. Schematic of LOM process (courtesy Helisys, Inc.)

Figure 2. Build procedure (a) First cutting (b) Peeling off (c) Platform up (d) Bonding (e) Second cutting (f) Platform down Figure 3. Sheet feeding mechanism Figure 4. Flowchart of generating cutting data Figure 5. (a) Ball in a box model (b) Generated support structure

PRIOR ART

Figure 6. (a) Bounding box of a sphere (b) Bounding pillar of a sphere

Figure 7. (a) Sliced data (b) Generated removal area for hollow region

Figure 8. (a) Bridges for islands (b) Bridges for sagging region

Figure 9. Sagging region can cause error.

Figure 10. (a) First cutting data (b) Second cutting data

Figure 11. Parts built by this system

RAPID PROTOTYPING METHOD FOR MINIMIZING POST PROCESSING

BACKGROUND OF THE INVENTION

Fabrication of prototype is required to discover in early stages any errors and factors which will complicate the production in large quantities. In order to save time and cost for prototyping, rapid prototyping method is introduced.

In most rapid prototyping methods, three dimensional shape data is approximated by two dimensional sectional data, and then three dimensional prototype is manufactured by layer-by-layer deposition using two dimensional sectional data.

There are two types in generating a layer; one is forming each layer by a phase change and the other is by simply cutting a sheet. The former approach requires much time, while the latter(sheet deposition approach) requires cost for post processing. The present invention is related to a rapid prototyping of sheet cutting type and focused on post processing.

There are several considerations for rapid prototyping system; low equipment price, low operating cost, high build speed, and less limitation on geometric shape. The most preferable type for the above considerations is sheet deposition type that laminates on layer at a time.

Figure 1:
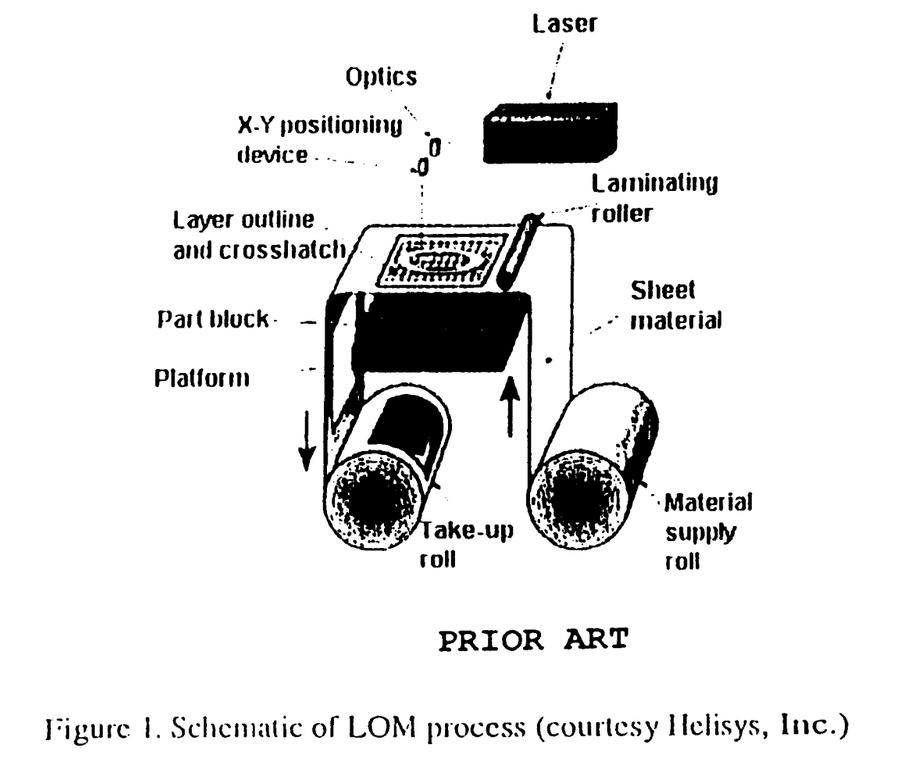
FIG. 1 shows a schematic diagram of LOM process according to the prior art.

In the prior art, there are several rapid prototyping methods of sheet deposition type. LOM(Laminated Object Manufacturing) in FIG. 1 has found widespread use over the past years. However, the LOM system has the following demerits: 1. Excessive material left in the building block should be removed after completion of lamination; 2. There are limitations on the feasible geometric shape such as small radius holes and trapped volumes; 3. Deformation may occur due to the heat bonding process.

SUMMARY OF THE INVENTION

In the present invention, a new method based on sheet deposition type is proposed. The new system can overcome the above mentioned demerits of the rapid prototyping system of sheet deposition type of the prior art. In the rapid prototyping system of sheet deposition type according to the present invention, adhesive sheet is used to bond layers in order to eliminate the deformation caused by heat. Also in order to minimize post processing and to eliminate limitation on the geometric shape, cutting process is performed twice per layer in the present invention. During the first cutting process and peeling-off process, excessive material is removed easily.

BRIEF DESCRIPTION OF THE DRAWINGS

FIG. 7(a) shows one of the layers generated from the part shown in FIG. 5(a), gray region in FIG. 7(b) indicates the removal area;

DETAILED DESCRIPTION OF THE INVENTION

The rapid prototyping method according to the present invention has two unique characteristics: i) adhesive sheet is used to bond layers; and ii) the cutting process is performed twice.

Figure 2:
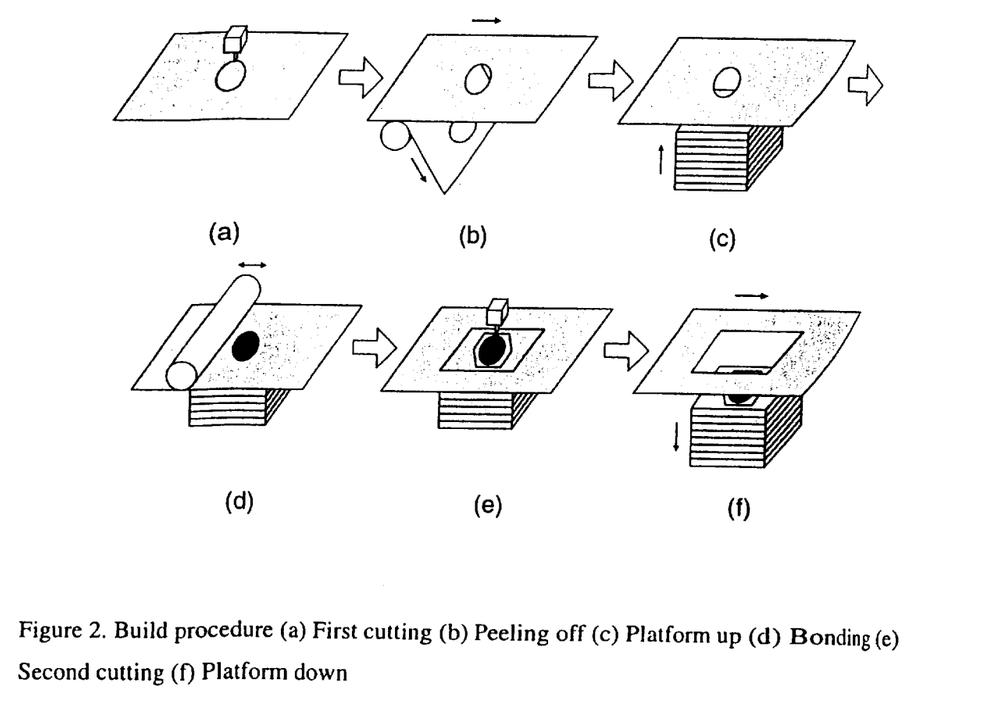
FIG. 2 shows a build procedure of the method according to the present invention: (a) first cutting, (b) peeling off, (c) platform up, (d) bonding, (e) second cutting, (f) platform down.

The build procedure of the rapid prototyping method of sheet deposition type according to the present invention is illustrated in FIG. 2. As shown in FIG. 2, the build procedure consists of six steps. FIG. 2(a) shows the first cutting step. The perimeter of excess region is cut by a sharp knife in the first cutting step. FIG. 2(b) shows a step of peeling off. The sheet with holes is fed to the previously-built part. While feeding, backing paper of an adhesive sheet is peeling off. Excess material which is cut in the first cutting step is removed with following the backing paper. FIG. 2(c) shows a step of lifting the platform. Platform is lifted upward. FIG. 2(d) shows a bonding step. The fed sheet is bonded to the previously-built part. FIG. 2(e) shows the second cutting step. The remained edges are cut in the second cutting process. FIG. 2(f) shows a step of lowering the platform. Platform is lowered. The above six steps are repeated until the lamination is completed. When the build procedure is finished, the excessive material is almost removed without additional removing step. Post processing includes only removing support structures and bridges that will be explained hereafter.

Figure 3:
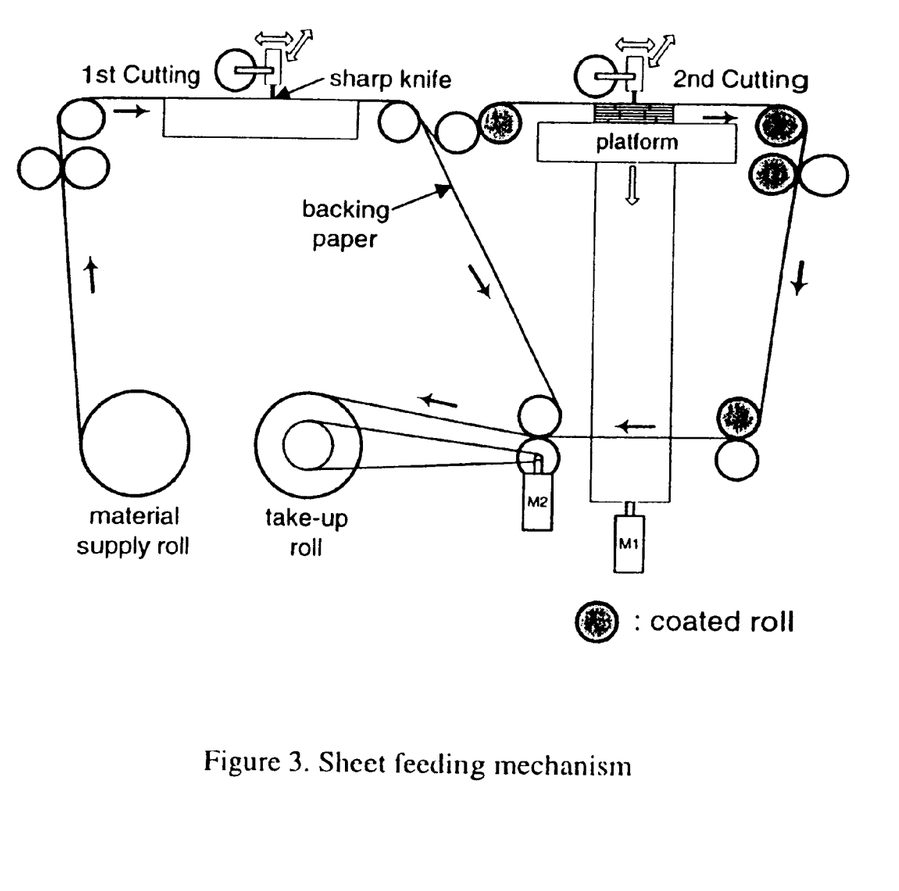
FIG. 3 shows sheet feeding mechanism used in the method according to the present invention.

FIG. 3 shows sheet feeding mechanism of the system according to the present invention. Two AC servo motors and one linear guide is used. This mechanism offers freedom in terms of material such as paper and plastics as long as they are in a sheet form with backing paper. In the present invention, a roll of glossy paper is used as feedstock.

The geometry of parts is represented as STL-industrial de facto standard. RapidWORKs98, developed at CAD laboratory of Seoul National University, is used for editing STL file, determining build-up direction, and generating support structure and silhouette curve. RapidADL, operating software for this system, is used for generating bridge, generating first and second cutting data, and operating hardware.

Since there are two cutting steps in the present invention, two groups of cutting data should be generated per layer. The boundaries of excessive material regions are cut in the first cutting step and the remained edges are cut in the second cutting step.

Figure 4:
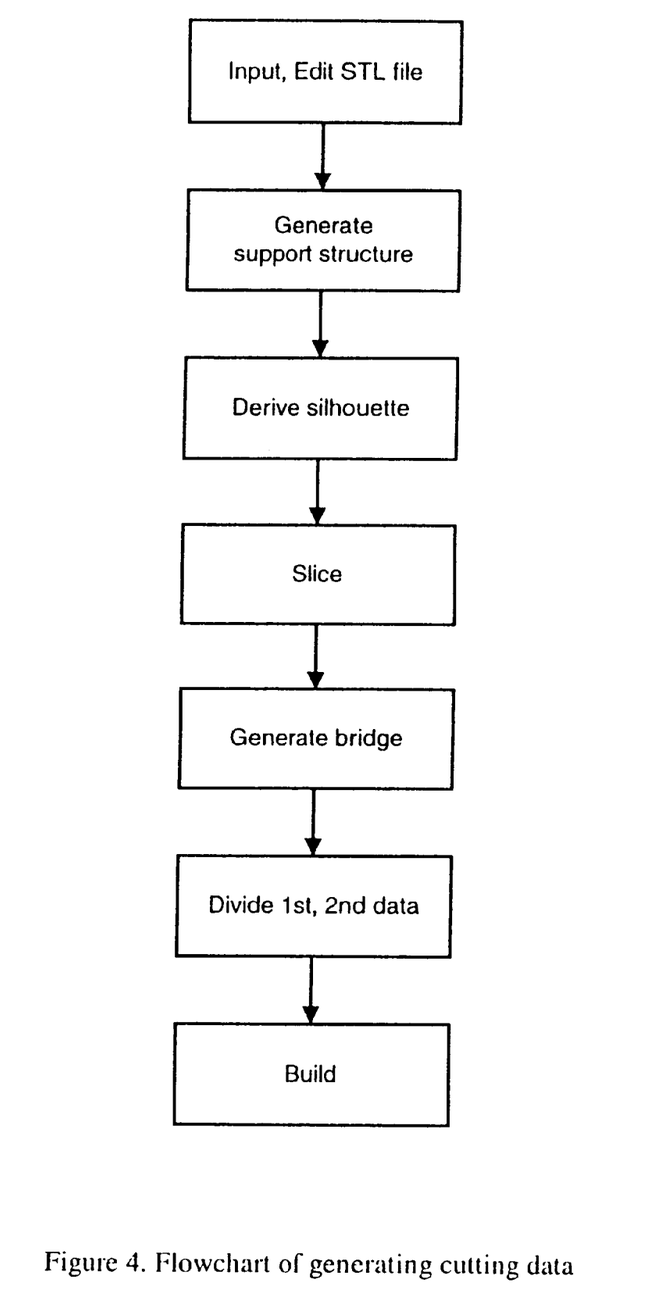
FIG. 4 shows flowchart of generating cutting data of the method according to the present invention.

The procedure of generating cutting data is shown in FIG. 4. After the STL file is repaired if it is incorrect, support structure and silhouette curve that will be used for generating removal areas are generated from 3D STL part. After slicing, removal regions and bridges are generated if needed. Finally, the cutting data are grouped into the first and the second cutting data. Each step of the procedure of generating cutting data will be described in detail hereafter.

The support structure in the procedure of generating cutting data is described in this paragraph. Most rapid prototyping systems such as SLA(Stereolithography Apparatus) and FDM(Fused Deposition Modeling) need support structure that prevents the part from wrapping, sagging, or parachuting. Because current sheet deposition rapid prototyping systems use the excess material as a structure, they do not need the support structure. In the rapid prototyping system of sheet deposition type according to the present invention, however, needs the support structure because the excess material is removed in the middle of the process.

Figure 5:
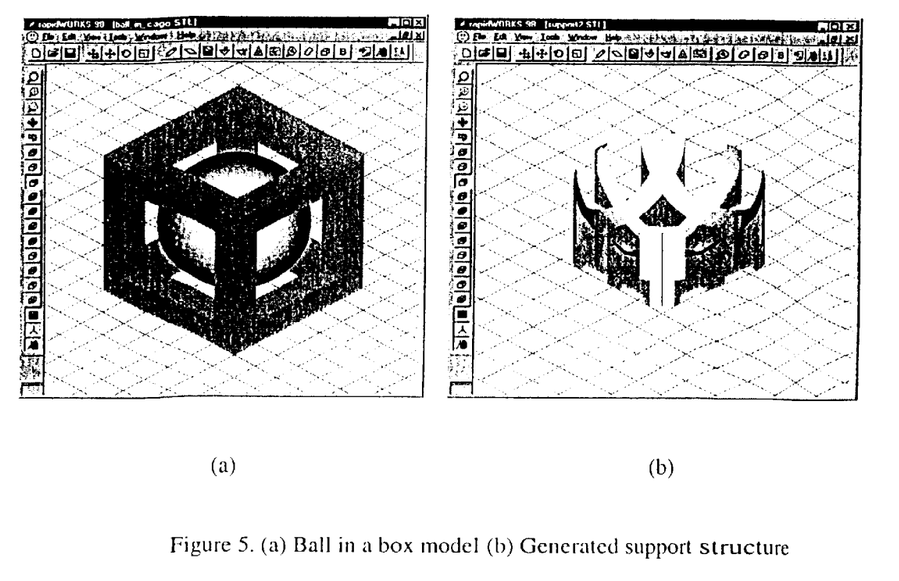
FIG. 5(a) shows ball in a box model.
FIG. 5(b) shows a generated support structure-a web-type support structure.

We generated web-type support structure as shown in FIG. 5. FIG. 5(a) shows a ball in box model which is built by the rapid prototyping system according to the present invention, and FIG. 5(b) shows a generated support structure in the procedure of generating cutting data of the present invention. Because the sheet deposition rapid prototyping method laminates one layer at a time whereas other rapid prototyping system such as SLA and FDM solidifies the material point-by-point, less support structure is needed than other systems.

Figure 6:
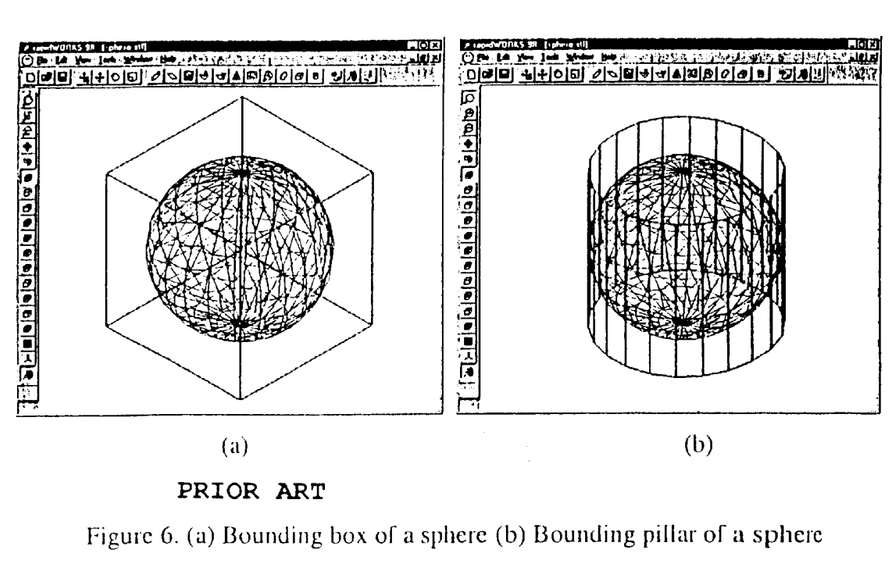
FIG. 6 shows a silhouette curve: (a) bounding box of a sphere of the prior art, (b) bounding pillar of a sphere of the present invention.

As mentioned above, excessive material is removed in the peeling-off step of the present invention. In order to minimize the removal area in the first cutting step, our system builds a part into a "bounding pillar" as shown in FIG. 6(b), which differs from the conventional sheet deposition rapid prototyping system that builds a part in the shape of a bounding box as shown in FIG. 6(a). The bounding pillar is a pillar whose section shape is equivalent to a silhouette curve of a part viewed in the build-up direction. For example, the bounding pillar of a sphere is a cylinder as shown in FIG. 6(b). To build a part as bounding pillar, the silhouette curve of a part should be extracted from STL part.

Referring to the slicing step in the procedure of generating cutting data, three dimensional solid part including support structure is sliced into two dimensional sectional data. We developed a proprietary two dimensional data format in order to include the silhouette curve as well as sectional data.

Figure 7:
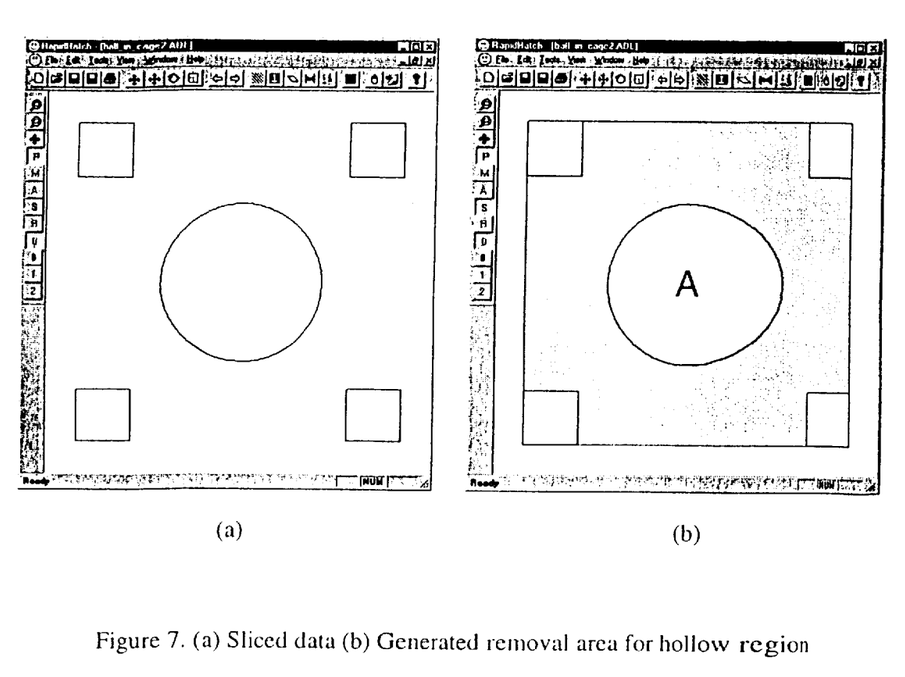

FIG. 7(a) shows one of the layers generated from the part model shown in FIG. 5(a). If this layer is laminated with a conventional system, unnecessary regions cannot be removed. Overcoming this problem, in the present invention, removal area for the hollow region is generated by two dimensional Boolean difference operation between silhouette curve and part regions. Gray region in FIG. 7(b) indicates the removal area.

Figure 8:
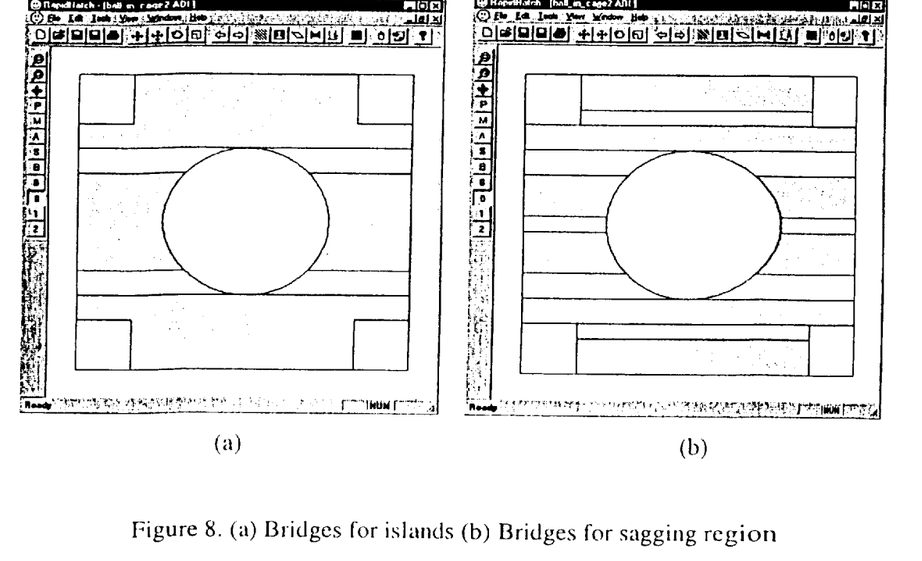
FIG. 8 shows generated bridges: (a) bridges for islands, (b) bridges for sagging region.

In FIG. 7(b), gray region is removed in the step of peeling-off. However, islands such as A in FIG. 7(b) are also removed together with backing paper in the step of peeling-off. To prevent this, we generate bridge for every island. Bridges are generated parallel to the sheet feeding direction. Two bridges are generated at both top-most and bottom-most point of each island. The width of bridge is given by user. When the bridges are overlapped, bridges are merged. FIG. 8(a) shows the generated bridges.

Figure 9:
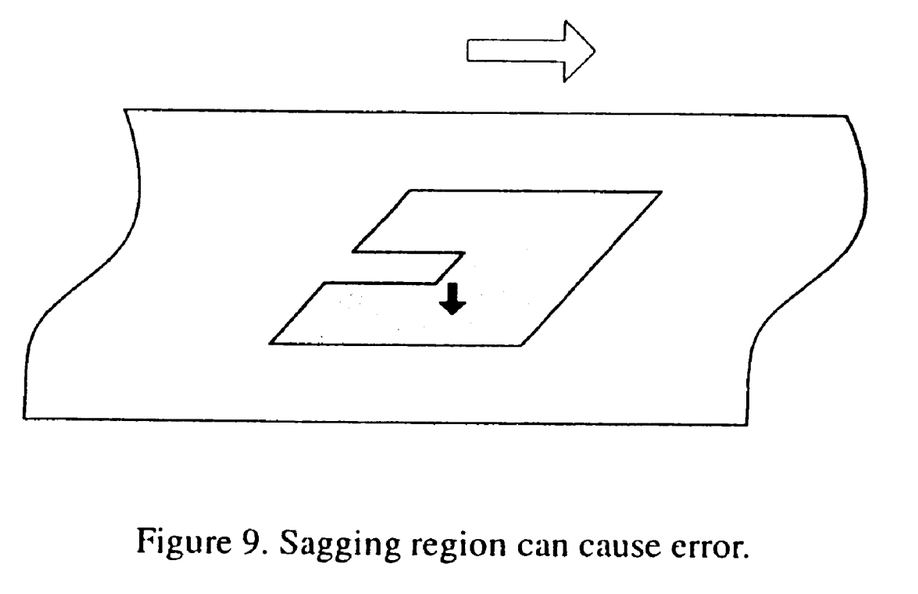
FIG. 9 shows a sagging region in concave area.

While feeding sheet, sagging region can reside in concave removal area as shown in FIG. 9. This sagging region with no backing paper can stick to an unexpected part of the frame. To prevent the problems caused by the sagging region, convexity checks for all removal areas are executed and new bridges are generated at the concave removal areas as shown in FIG. 8(b).

Figure 10:
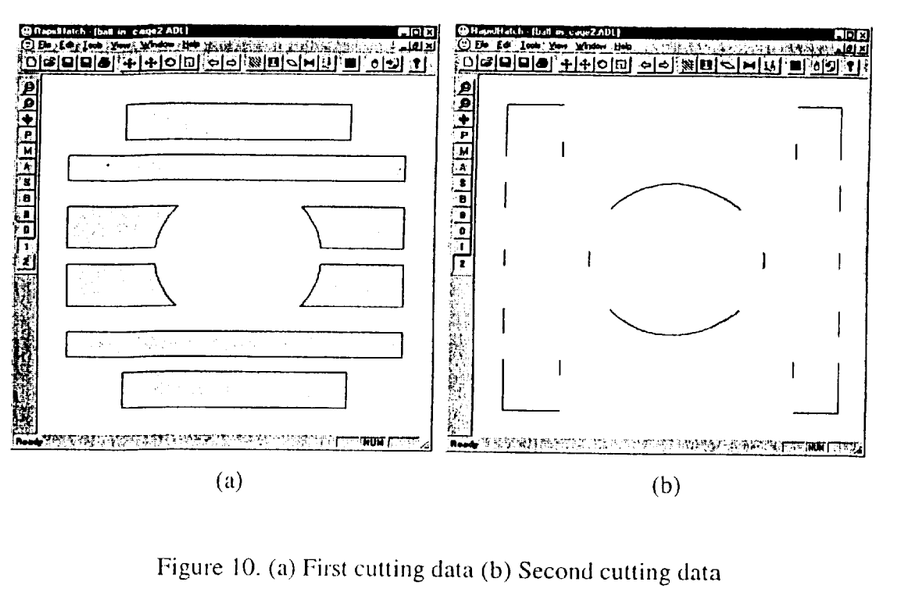
FIG. 10 shows the first and second cutting data of the sectional data shown in FIG. 8(b): (a) the first cutting data, (b) second cutting data.

Finally, the generated data are grouped into the first and the second cutting data. The first cutting data consist of boundary edges of all removal areas, and the second cutting data consist of remaining edges. FIG. 10 shows the first and the second cutting data of the sectional data shown in FIG. 8(b).

Figure 11:
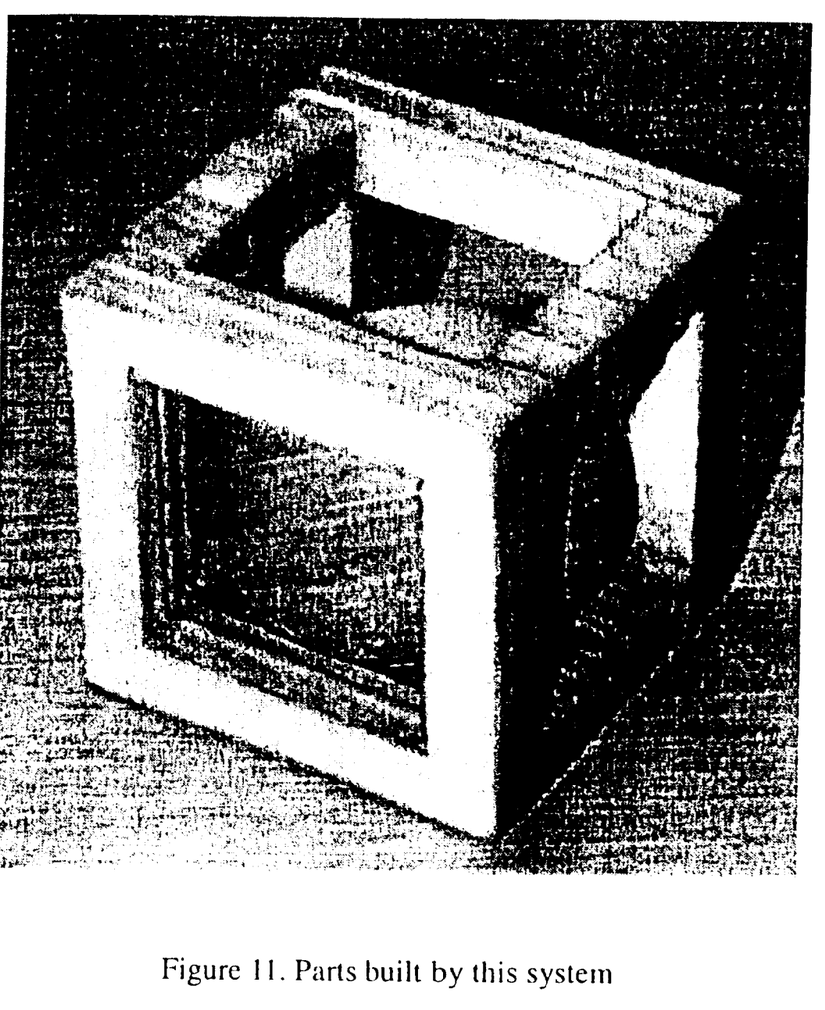
FIG. 11 shows a part of ball in a box model built by the method according to the present invention.

Currently, the maximum build volume of this method is 400×400×300 (mm$^3$). Ball in box model built by this system is shown in FIG. 11. The number of layer is 600. The build time is 7 hours. The thickness of glassy paper is 0.095 mm.

What is claimed is:

1. A method for rapid prototyping, comprising:
   (a) a procedure of generating cutting data which consists of
      (i) a step of generating a support structure;
      (ii) a step of deriving a silhouette curve;
      (iii) a step of slicing in which three dimensional data is sliced into two dimensional sectional data;
      (iv) a step of generating bridges for every island in the two dimensional sectional data; and
      (v) a step of generating cutting data and grouping the cutting data into, first and second cutting data groups, and
   (b) a procedure of building a part in which adhesive sheets are used as bond layers, and which consists of
      (i) a step of first cutting an adhesive sheet according to the first cutting data in the procedure of generating cutting data, in which a perimeter of excess adhesive sheet region is cut to provide excess adhesive sheet material:
      (ii) a step of peeling of backing paper of the adhesive sheet, in which the excess adhesive sheet material is removed with the peeled backing paper;
      (iii) a step of providing and lifting a platform, in which the cut adhesive sheet is fed to a previously-built part;
      (iv) a step of bonding, in which the fed sheet is bonded to the previously-built part;
      (v) a step of second cutting the bonded adhesive sheet according to the second cutting data in the procedure of generating cutting data, in which remaining adhesive sheet edges are cut;
      (vi) a step of lowering the platform; and
      (vii) a step of post processing, in which the support structure and bridges are removed to form the built part.

2. The method of claim 1, wherein the step of deriving a silhouette curve in the procedure of generating cutting data is characterized by bounding a pillar type which is a pillar whose sectional shape is equivalent to the silhouette curve of a part viewed in the build-up direction.

3. The method of claim 1, wherein the a step of generating bridges consists of a sub-step of generating bridges and a sub-step of generating bridges for a sagging region which resides in a concave removal area.

4. The method of claim 1, wherein the step of generating bridges is characterized by that the bridges are parallel to a direction that the adhesive sheet is fed to the previously built part.

* * * * *